United States Patent
Garetto

[15] 3,647,043
[45] Mar. 7, 1972

[54] DEVICE FOR LOADING OBJECTS AND CONVEYING THEM FROM A LOADING STATION TO AT LEAST ONE WORKING STATION

[72] Inventor: Bruno Garetto, Ivrea, Italy
[73] Assignee: Ing. C. Olivetti & C. S.p.A., Ivrea, Italy
[22] Filed: Apr. 23, 1970
[21] Appl. No.: 31,222

[30] Foreign Application Priority Data

Apr. 28, 1969 Italy...............................51605 A/69

[52] U.S. Cl....................................198/19, 198/209, 269/57
[51] Int. Cl. .......................................B23q 1/04, B23q 5/22
[58] Field of Search..................198/19, 209; 74/813; 269/57

[56] References Cited

UNITED STATES PATENTS

| 2,626,702 | 1/1953 | Basus......................................198/209 |
| 644,003 | 2/1900 | Cook......................................198/209 |

*Primary Examiner*—Edward A. Sroka
*Attorney*—Birch, Swindler, McKie & Beckett

[57] ABSTRACT

A device for loading objects and conveying them from a loading station to a working station of a machine tool comprises two plates formed of circular sectors rotatable about a fixed shaft. The two sectors are rotated independently of one another so as to bring them alternately to said loading station and said working station through a pair of friction rings. Each plate is retained at the different stations by stop plungers controlled by electromagnets for times which are determinable independently for the different stations.

5 Claims, 2 Drawing Figures

PATENTED MAR 7 1972　　3,647,043

INVENTOR.
BRUNO GARETTO

DEVICE FOR LOADING OBJECTS AND CONVEYING THEM FROM A LOADING STATION TO AT LEAST ONE WORKING STATION

CROSS-REFERENCE TO RELATED APPLICATION

Applicant claims priority from the corresponding Italian Patent application, Ser. No. 51605-A/69, filed Apr. 28, 1969.

BACKGROUND OF THE INVENTION

The present invention relates to a device for loading objects and conveying them from a loading station to at least one working station, in particular for machine tools.

Various devices of the aforesaid type for loading workpieces are known which are fitted to machine tools equipped with one or more headstoks for carrying out successive machining operations on the workpieces. In one known device, a turntable is loaded manually or automatically with one or more workpieces to be machined and is rotated cyclically to bring the pieces into correspondence with each headstock. Since the time required for loading and unloading the workpieces and that required for carrying out each machining stage are normally different, notwithstanding the fact that the operating heads work at the same time, these devices have considerable dead times.

Moreover, a loading device of the aforesaid type fitted to a machine tool in which the tools are changed automatically is known in which there are provided two worktables movable on a shuttle system, each independently of the other, between two separate loading positions and a central working station. While the headstock carries out the machining operations on the workpieces accommodated on one worktable, the machined workpieces are unloaded from the other table, which is thereafter loaded with more pieces to be machined. This device requires the operator to move from one end of the bed to the other, so that it is very inconvenient.

SUMMARY OF THE INVENTION

The present invention provides a device for loading objects and conveying them from a loading station to at least one working station, comprising at least two plates occupying circular sectors and which are rotatable about a fixed shaft, drive means being provided for rotating the plates independently of one another so as to bring them alternately to the loading station and the or each working station and control means being provided for retaining each plate at the different stations for times which are determinable independently for the different stations.

A preferred embodiment of the invention is dealt with by way of example in the following description and shown in the accompanying drawing.

DETAILED DESCRIPTION OF THE INVENTION

Figure 1:
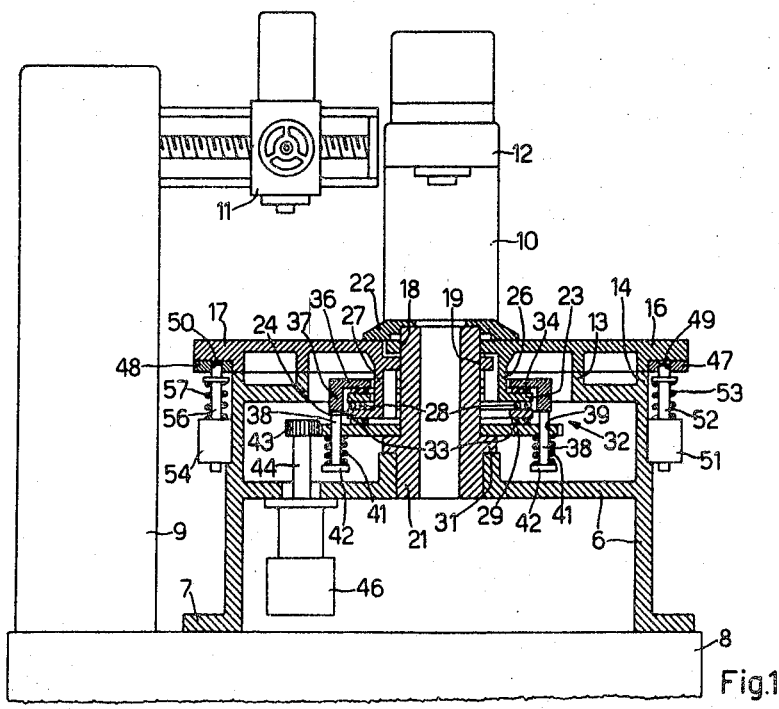
FIG. 1 is a longitudinal section of a loading and conveying device embodying the invention fitted to a machine tool.

Referring to FIG. 1, the device includes a cylindrical, drum-like frame 6 which is fixed by means of a flange 7 to a bed 8. To this bed there are fixed two standards 9 and 10 on which there are mounted two headstocks 11 and 12 of a machine tool. The frame 6 is provided with two circular guides 13 and 14 on which bear two plates 16 and 17 in the form of circular sectors. The plates 16 and 17 are rotatable about a hollow shaft 21 which is set in the frame 6, this shaft passing through holes 18 and 19 in the two plates respectively. A flange 22 fixed to the hollow shaft 21 kepts the plates 16 and 17 in contact with the circular guides 13 and 14. At the bottom the plates 16 and 17 have flanges 23 and 24, respectively, in the form of circular rings integral with hub sectors 26 and 27, respectively. Two rows of balls 28 are interposed between the circular flanges 23 and 24.

A gear 29 is mounted loosely on the hollow shaft 21 and rests on a circular flange 31 integral with the shaft 21. A friction assembly 32 includes two rings 33 and 34 of material with a high coefficient of friction, for example brake lining material. The ring 33 is accommodated between the flange 24 and the gear 29 and the ring 34 is accommodated between the flange 23 and a plate 36. This plate has a cylindrical rim 37 in which there are fixed a number of stems 38 engaged in an equal number of holes 39 formed in the gear 29. Around the stems 38 there are compression springs 41 disposed between the gear 29 and heads 42 on the lower ends of the stems. The springs 41 hold the plate 36 and the ring 34 against the circular flange 23 and the gear 29 and the ring 33 against the circular flange 24. The gear 29 is always in mesh with a pinion 43 fixed to a shaft 44 of an electric motor 46 which is fixed to the frame 6. The motor 46 causes the gear 29 to rotate continuously through the medium of the pinion 43 and the gear transmits the rotation to the plates 16 and 17 through the friction assembly 32. Obviously the stems could be fixed to the gear and pass through the plate 36.

Each plate 16 and 17 must stop for a predetermined time at the loading station and the working station. To this end, sectors 47 and 48 provided with a row of holes 49 and 50 respectively, which are arranged circumferentially, are fixed to the underside of the outer edges of the plates 16 and 17. An electromagnet 51 fixed to the frame 6 in correspondence with the loading station for the workpieces has a plunger 52 which is adapted to engage in the holes 49 and 50 by the action of a spring 53 when the electromagnet 51 is not energized. A second electromagnet 54, fixed to the frame 6 in correspondence with the headstock 11, has a plunger 56 which is adapted to engage in the holes 49 and 50 by the action of a spring 57 when the electromagnet 54 is not energized. A third electromagnet 58 (FIG. 2) having a plunger 59 similar to that of the electromagnet 54 is fixed to the frame 6 in correspondence with the headstock 12.

The loading and conveying device operates in the following manner.

Figure 2:
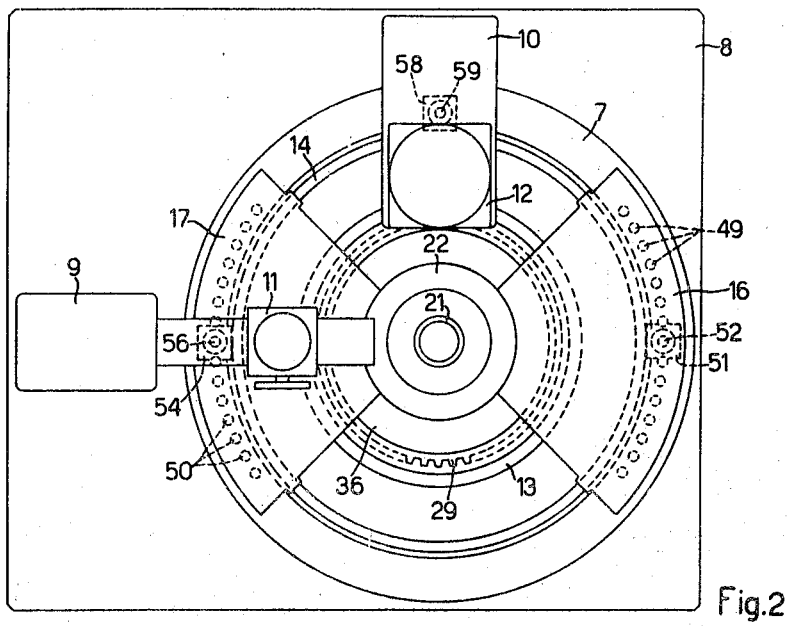
FIG. 2 is a plan view of the device of FIG. 1.

Let it be assumed that the plate 16 is at the workpiece loading station as in FIG. 2 and has been arrested by the electromagnet 51 by means of the plunger 52, which is engaged in a hole 49. Let it be assumed, moreover, that the plate 17 is loaded with one or more workpieces to be machined and is stopped by the electromagnet 54 with the plunger 56 engaged in a hole 50 in correspondence with the headstock 11. The headstock 11 is carrying out its machining operation on the piece to be worked, while the headstock 12 is at rest and the plunger 59 is kept raised by the relevant spring. The motor 46 causes the gear 29 to rotate continuously, despite the fact that the plates 16 and 17 are stationary, so that the friction assembly 32 slips. The plates 16 and 17 are adapted to be arrested either a single time or several times in correspondence with the loading station and the working heads 11 and 12, according to the cycle. To simplify the description, let us assume that the plates 16 and 17 must be stopped a single time and in the intermediate position, as in FIG. 2. In such case, all the holes 49 and 50, except the center holes, are suitably plugged beforehand. The operation of loading the workpieces on to the plate 16 having been completed, the electromagnet 51 is energized by means of a manual control or a program device. The plunger 52 is lowered in opposition to the action of the spring 53 and clears the holes 49, as a result of which the plate 16 is rotated clockwise by the motor 46 through the medium of the friction assembly 32. The electromagnet 51 remains energized until the plate 16 has moved beyond the electromagnet itself and is then deenergized, so that the spring 53 raises the plunger 52 again. The balls 28 interposed between the flanges 23 and 24 reduce the friction due to the relative motion of the flanges 23 and 24. If the machining operations on the workpieces accommodated on the plate 17 have not been completed, the plate 16 is stopped against the plate 17 when it comes into contact therewith.

The machining by the headstock 11 having been completed, the corresponding electromagnet 54 is energized, the plunger 56 leaves the hole 50 and the plate 17 is rotated together with the plate 16, which prevents the plunger 56 returning to its high position until the plate 16 reaches its predetermined position. The plunger 56 then enters the hole 49 through the action of the spring 57 and the plate 16 is arrested. Simultaneously, the electromagnet 58 corresponding to the working head 12 is temporarily energized in known manner before the plate 17 arrives over the plunger 59. The sector-shaped plate 17 therefore continues to rotate and is brought over the plunger 59. The electromagnet 58 is now deenergized and the plunger 59 is urged upwardly and jumps into the corresponding hole 50, stopping the plate 17. The headstock 12 begins the machining operations on the workpieces accommodated on the plate 17.

The machining operations by the headstock 12 having been completed, the electromagnet 58 is energized in known manner and brings down the plunger 59, which releases the sector-shaped plate 17. The plate begins to rotate until it is arrested in the predetermined position, in a manner similar to that seen hereinbefore, by the electromagnet 51 at the workpiece loading station. The operator now unloads the machined workpieces from the plate 17 and loads on to it more workpieces to be machined. In turn, the machining operations by the headstock 11 having been completed, the electromagnet 54 is energized and the plate 16 rotates and is brought into correspondence with the headstock 12, where it is arrested by the electromagnet 58. The plate 17, in turn, comes back into correspondence with the headstock 11 in a manner similar to that seen hereinbefore in the case of the plate 16.

Among many possible modifications, we mention the following: The hollow shaft 21 may house tubes for the passage of compressed air for operating fixtures mounted on the sector-shaped plates 16 and 17. Moreover, tools or equipment adapted to cooperate with each of the sector-shaped plates can be passed through the hollow shaft 21. The commands for causing the plates 16 and 17 to stop, for controlling the headstocks 11 and 12 and for unloading the workpieces accommodated on the sector-shaped plates and loading them thereon may be carried out through a program device, while the electromagnets may be deenergized from time to time by means of a numerical control system, thus avoiding the need to plug the holes 49 and 50 at which the stopping of the plates 16 and 17 is not desired. Moreover, the holes in each sector may be disposed in a plurality of tracks. All or selected ones of the holes may be used to load, machine and unload several workpieces mounted in a row on a plate.

What I claim is:

1. A device for loading objects and conveying them from a loading station to at least one working station, comprising:
    a fixed shaft,
    at least two plates in the form of circular sectors and rotatable about said fixed shaft,
    drive means comprising:
        a continuously rotated motor,
        a gear rotated by said motor, and
        a friction assembly disposed between said plates and said gear for causing said gear to rotate said plates independently of one another so as to bring them alternately to said loading station and said working station, and
    control means for retaining each of said plates at the different stations for a time corresponding to that required for each station.

2. A device according to claim 1, wherein said control means comprise:
    a member fixed to each of said sector-shaped plates,
    a series of holes circumferentially arranged on each of said sector-shaped plates,
    an electromagnet fixed at each station and adapted to be operated selectively, and
    a stop plunger controlled by each of said electromagnets to cooperate with said holes.

3. A device according to claim 1, wherein said friction assembly comprises:
    at least two friction rings
    a flange in the form of a circular ring integral with one of said sector-shaped plates, one of said friction rings being accommodated between said gear and said flange,
    a second flange in the form of a circular ring integral with the second of said sector-shaped plates, and
    a further plate connected to said gear by a plurality of stems, the other of said friction rings being accommodated between said second flange and said further plate.

4. A device according to claim 3, wherein the stems pass slidably through the gear of said further plate, the friction rings being kept in compression by compression springs carried by said stems and acting upon said gear or said further plate.

5. A device according to claim 3, comprising:
    at least one row of balls interposed between said flanges in the form of circular rings to reduce the friction between the flanges during relative movement thereof.

* * * * *